United States Patent

[11] 3,610,824

[72] Inventors Richard F. Hansen
Penfield;
Frank L. Headd, Webster; Donald William Schaeffer, Webster, N.Y.; Ronald F. Rueckwald, San Mateo, Calif.

[21] Appl. No. 758,930
[22] Filed Sept. 11, 1968
[45] Patented Oct. 5, 1971
[73] Assignee Xerox Corporation
Rochester, N.Y.

[54] FACSIMILE SCANNING APPARATUS
5 Claims, 8 Drawing Figs.

[52] U.S. Cl. .......... 178/7.6, 178/6, 178/6.6, 178/DIG. 20, 346/74 ES, 346/139 C

[51] Int. Cl. .......... H04n 1/06, H04n 1/30

[50] Field of Search .......... 346/139 C; 178/7.1 E, 7.6, 6 BW, 6.7, 5, 6.6; 346/74 ES

[56] References Cited

UNITED STATES PATENTS

| | | | |
|---|---|---|---|
| 1,857,130 | 5/1932 | Alexanderson | 178/7.6 |
| 2,394,649 | 2/1946 | Young | 178/7.1 E |
| 2,443,953 | 6/1948 | Gillespie | 178/7.6 |
| 2,754,170 | 7/1956 | Felton | 346/139 C |
| 2,829,942 | 4/1958 | Bedell | 346/139 C |
| 2,878,310 | 3/1959 | Becker | 178/6 BW |
| 3,061,670 | 10/1962 | Oster | 178/6 BW |
| 3,469,027 | 9/1969 | Reese | 178/7.6 |
| 3,342,126 | 9/1967 | Nesin | 346/74 ES X |
| 3,489,850 | 1/1970 | Adams | 346/74 ES X |

*Primary Examiner*—Robert L. Griffin
*Assistant Examiner*—Joseph A. Orsino, Jr.
*Attorneys*—Paul M. Enlow, Ronald Zibelli, James J. Ralabate, Norman E. Schrader and Terry J. Anderson

ABSTRACT: Facsimile scanning apparatus having a rotatable support member with first transducing means operatively associated therewith for converting information on record media into representative electrical signals for transmission to a remote location, and second transducing means operatively associated therewith for converting electrical signals received from a remote location into representative patterns of information on record media. The rotatable support member is positioned adjacent a scanning station axially located along a passageway formed by a first media support member having a convex semicylindrical surface extending axially therealong and a second media support member having a concave semicylindrical surface extending axially therealong which cooperate when in the operative position to form a curvilinear passageway through which record media are advanced. The rotatable support member is rotated about the longitudinal central axis of the passageway and in the transmit mode, the read transducing means are activated to generate representative electrical signals of information on record media supported at the scanning station as the transducing means traverse the record media. In the receive mode, the record transducing means are activated to produce electrostatic charge patterns on a dielectric record media positioned within the passageway at the scanning station in response to received electrical signals representative of the information.

INVENTORS
RICHARD C. HANSEN
FRANKLIN L. HEADD
RONALD W. RUECKWALD
DONALD W. SCHAEFFER
BY Terry J. Anderson
ATTORNEYS

FACSIMILE SCANNING APPARATUS

BACKGROUND OF THE INVENTION

This invention relates generally to facsimile scanning apparatus and more particularly to apparatus for converting information into representative electrical signals and for converting such electrical signals into representative patterns of intelligence on suitable record media.

In the art of facsimile, recorded information at a first location may be transmitted to a second location, remote from the first location by means of a suitable transmission medium, reproducing an exact copy of the original information at the second location. In a typical facsimile system, documents, for example, the information of which is to be transmitted, are scanned by a read transducer to convert the information contained thereon into a series of electrical or video signals. These video signals are then coupled to the input of the transmitting medium which interconnects the transmitter with a receiver. At the receiving location, the electrical or video signals are converted by a recording transducer scanning a suitable record medium whereby to generate a facsimile of the transmitted information.

The term transceiver has been employed in the facsimile art to designate facsimile apparatus which is capable of operation both as a transmitter and a receiver. Many facsimile systems employ the use of facsimile transceivers of the half-duplex type. That is, transceiver apparatus which is capable of functioning in either the transmit mode or the receive mode at a particular time but which is incapable of operating in both the transmit and receive modes simultaneously. Although such operation would appear to impose a severe limitation on such systems, it instead has proven to be a distinct advantage. In most facsimile systems, it has been found that simultaneous transmission and recording has not been an absolute requirement. As a result, many duplicated components required for simultaneous transmitting and receiving can be reduced to a single component in a transceiver apparatus, thus substantially reducing the cost of the facsimile apparatus, as well as additional advantages which accrue to having a single piece of apparatus capable of functioning both as a transmitter and as a receiver.

However, heretofore, most transceiver apparatus has utilized separate scanning apparatus for the reading and recording processes. That is, one piece of apparatus in the transceiver is utilized to scan documents for converting information into representative electrical signals for transmission, and a second piece of apparatus is utilized for converting the received electrical signals into representative patterns of intelligence on the record media. To further reduce the duplication of elements in transceiver apparatus, that is, to utilize the same device for converting information into representative electrical signals and for converting such electrical signals into representative patterns of intelligence on suitable record media. This means that the scanning apparatus must not only be capable of operating effectively in generating the representative electrical signals but must also be capable of making efficient use of these electrical signals and to convert them into the representative patterns of intelligence on the record media. This has proven thus far to be one of the most difficult requirements to meet, for a number of reasons, some of which include the incompatibility between various reading and recording processes and the inadaptability of various reading and recording processes to the same scanning technique. Prior devices have heretofore failed to produce optimum results in both the transmit and receive modes.

SUMMARY OF THE INVENTION

Accordingly, it is an object of the present invention to provide facsimile scanning apparatus for converting information into representative electrical signals and for converting such electrical signals into representative patterns of intelligence on suitable record media.

It is another object of the present invention to provide optical scanning apparatus adapted for use in a facsimile transceiver which is capable of effectively producing a representative electrical signal from various background densities and colors.

It is still another object of the present invention to provide electrographic recording apparatus adapted for use in a facsimile transceiver for producing latent electrostatic patterns of intelligence on suitable record media in response to received representative electrical signals.

It is yet another object of the present invention to provide scanning apparatus adapted for use in a facsimile transceiver which when operated in the transmit mode utilizes optical scanning techniques for converting information on documents and the like into representative electrical signals for transmission to a remote location and which when operated in the receive mode utilizes electrographic recording techniques for converting received electrical signals into representative patterns of intelligence on suitable record media.

It is yet a further object of the present invention to provide facsimile scanning apparatus adapted for use in a facsimile transceiver in which transducing means are supported on a rotatable support member for converting information into representative electrical signals when operated in the transmit mode and for converting electrical signals into representative patterns of intelligence on suitable record media when operated in the receive mode.

These and other objects of the invention are attained by means of a rotatable support member having first transducing means operatively associated therewith for converting information on record media into representative electrical signals for transmission to a remote location, and second transducing means operatively associated therewith for converting electrical signals received from remote location into representative patterns of information on record media.

The rotatable support member with the transducing means associated therewith is positioned adjacent a scanning station axially located along a passageway formed by a first media support member having a convex semicylindrical surface extending axially therealong and a second media support member having a concave semicylindrical surface extending axially therealong which cooperate when in the operative position to form a curvilinear passageway through which record media are advanced. The rotatable support member is rotated about the longitudinal central axis of the passageway and in the transmit mode, the read transducing means are activated to generate representative electrical signals of information on record media supported at the scanning station as the transducing means traverse the record media. In the receive mode, the record transducing means are activated to produce electrostatic charge patterns on a dielectric record media positioned within the passageway at the scanning station in response to received electrical signals representative of the information.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
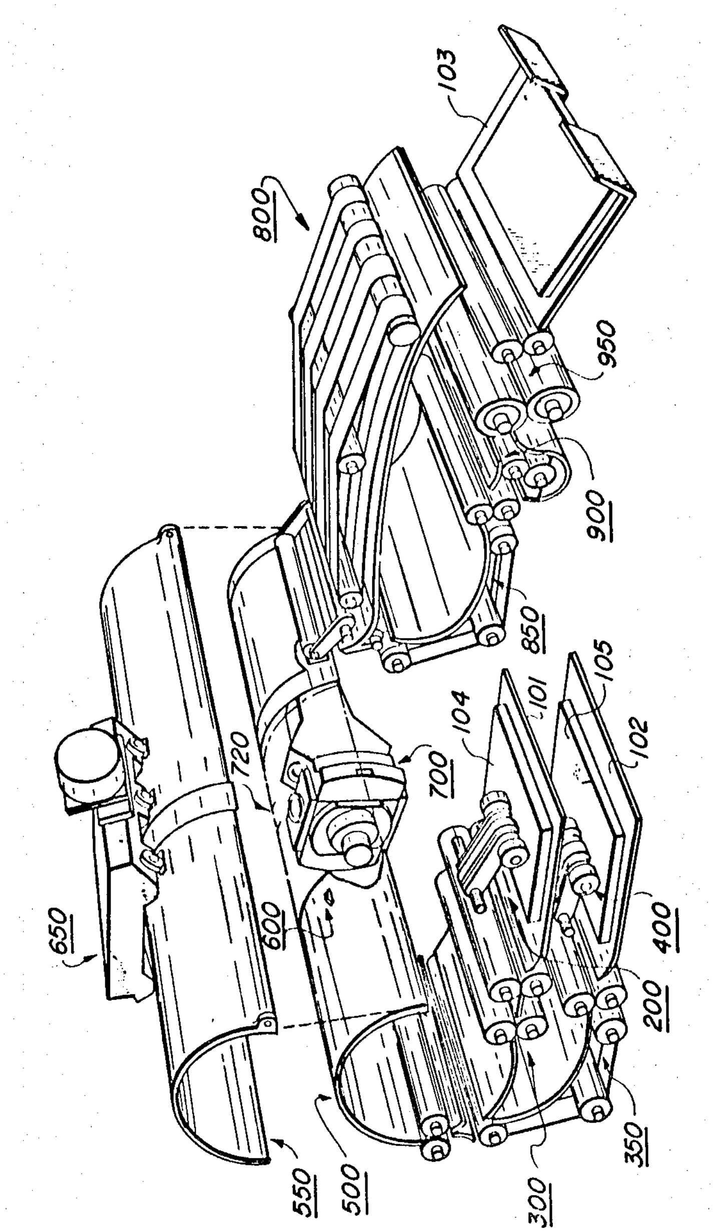
FIG. 1 is a schematic perspective view of a facsimile transceiver in which the scanning apparatus according to the present invention is particularly adapted for use.

The scanning apparatus according to the present invention is particularly adapted for use in a facsimile transceiver of the type disclosed in copending application Ser. No. 758,932, filed concurrently herewith in the names of Halbert M. Harris et al. and assigned to the same assignee as the instant invention.

In a preferred embodiment of the facsimile apparatus, an inner platen assembly generally designated 500 having an outer convex surface of generally semicylindrical configuration and an outer platen assembly generally designated 550 having an inner concave surface of generally semicylindrical configuration cooperate when in the operative position to form a curved guide or curvilinear passageway through which copy sheets and documents are supported and advanced in both the transmit and receive modes of the transceiver.

A scanning station generally designated 720 at which information on original documents is scanned and converted to representative electrical signals when operated in the transmit mode, and at which such electrical signals are converted into representative patterns of intelligence on suitable record media when operated in the receive mode is axially positioned along the passageway defined by inner platen 500 and outer platen 550.

Documents, 104, the information on which is to be transmitted by the transceiver to a remote location are placed into the machine on a document support tray 101. These documents 104 are advanced by an automatic document feeder generally designated 200 and a document transport system generally designated 300 into the passageway defined by inner platen assembly 500 and outer platen assembly 550. Upon receipt of the proper signals, a document 104 within the passageway is then advanced axially therealong by a first paper drive mechanism generally designated 600 to the scanning station 720. When a document reaches the scan position, the paper drive assembly 600 is removed from engagement with the subject copy, and a second paper drive generally designated 650, upon receipt of appropriate activating signals is engaged to control the advancement of the subject copy through the scan area.

Copy sheets 105, onto which information is to be recorded when the transceiver is operated in the receive mode, are placed into the machine on a copy support tray 102 located beneath the document support tray 101. Copy sheets 105 are advanced from the support tray 102 by means of an automatic copy feeder generally designated 400 and are transported into the passageway defined between inner platen assembly 500 and outer platen assembly 550 by means of a copy transport generally designated 350. When in position within the passageway, a copy sheet 105 is then advanced to the scan area 720 by the paper drive generally designated 600 in a manner similar to that in which a document is advanced. When in a scanning position, and upon receipt of suitable control signals the paper drive 600 is removed from engagement with a copy sheet and the stepping drive 650 engaged therewith.

In a preferred arrangement, inner platen assembly 500 includes a first arcuately shaped support member 501 having a generally semicircular cross section with a pair of support flanges (not shown) thereon, and a second arcuately shaped support member 502 having a generally semicircular cross section with a pair of support flanges (not shown) thereon. Support members 501 and 502 are mounted on upper frame base member 109 via bolts or other suitable fastening means through the support flanges. Support members 501 and 502 are spaced from each other at the inner ends thereof on upper frame base member 109 to provide a space therebetween to facilitate scanning and recording at the scanning station 720.

A first pair of idler rollers 503 and (only one being shown in FIG. 2) are rotatably supported by support member 502 adjacent scanning station 720. Idler rollers 503 are angularly spaced from each other and project through apertures in support member 502 beyond the outer surface thereof. A second set of idler rollers 504 (only one being shown) similar to idler rollers 503 are spaced axially along support member 502 from idler rollers 503. Idler rollers 504 are similarly rotatably mounted from the inner side of support member 502 and project through apertures therein to slightly above the outer surface of support member 502. Idler rollers 504 are angularly aligned with idler rollers 503 and will be further described in connection with the paper driving apparatus 650 referred to hereinafter.

Outer platen assembly designated 550 includes a first arcuately curved member 551 having a generally semicircular cross section and a second arcuately curved member 552 having a similarly generally semicircular cross section. A backing member 558 having an inner concave surface which conforms to the generally semicircular cross section of members 551 and 552 is positioned therebetween to overlie the space between support members 501 and 502 at the scanning station 720 when outer platen assembly 550 is in the closed or operative position. Backing member 558 serves to provide a smooth uniform surface on which record media are supported at the scanning station and is held at ground potential during the recording process. Support members 551 and 552 with backing member 558 therebetween are rigidly connected to form a unitary outer platen assembly via a plurality of axially extending rods 555 connected through end mounting plates 553 and 554 and flanges 556 in arcuate members 551 and 552. Outer platen assembly 550 is pivotally mounted on the support frame structure via pivot pins, not shown, through end mounting plates 553 and 554 and upper frame base 109. Outer platen assembly 550 when in the closed position is supported at the side opposite the pivot pins by means of support pads, not shown, connected to upper frame base 109 which engage V-notches 560 in end plates 553 and 554. From this arrangement it thus may be seen that when outer platen assembly 550 is in the closed position there is provided a passageway having a generally semicircular cross section within which documents and copy sheets are supported and scanned during the reading and recording processes.

The high-speed input drive apparatus generally designated 600 and the output and stepping drive apparatus generally designated 650 cooperate to transport a document or copy sheet axially along the passageway defined between inner platen assembly 500 and outer platen assembly 550. A wheel support frame 607 is pivotally connected to upper frame base 109 via support bracket 614 and pivot shaft 615. A pair of idler roller members 687 and 688 are rotatably mounted on stub shafts connected to one end of wheel support frame 607 adjacent the input side of scanning zone 720. Idler rollers 687 and 688 are angularly spaced from each other and project through suitable apertures in inner support member 501 to align with idler roller members previously described. At the opposite end of wheel support frame 607 are mounted a pair of friction drive wheels 612 and 613. Drive wheels 612 and 613 are rotatably mounted on wheel support frame 607 via stub shafts 610 and 611. Friction drive wheels 612 and 613 are preferably formed from a material having a high coefficient of friction and are adapted upon pivotable movement of wheel support frame 607 to project into the passageway defined between inner platen assembly 500 and outer platen assembly 550 via suitable apertures in inner platen 501.

Friction drive wheels 612 and 613 may be driven by means of a motor MOT–600 connected to upper frame base member 109 via mounting bracket 621. Motor MOT–600 may include a suitable reduction drive therein to provide the desired speed of rotation at output shaft 601. A stub shaft 605 is rotatably mounted in wheel support frame 607 and has connected thereto a helical drive gear 606. Drive gear 606 meshes with a pair of helical gears 608 and 609 connected to stub shafts 610 and 611 respectively. Stub shaft 605 is connected to the output shaft 601 of motor MOT–600 via a pair of flexible drive couplings 602 and 604 and an intermediate stub shaft 603.

A rotary solenoid SOL–600 is connected to upper frame base member 109 via mounting bracket 616. Rotary solenoid SOL–600 includes a lever arm 620 which extends therefrom and is engageable with a pin 617 projecting from wheel support frame 607. A spring member 618 at one end thereof also engages projecting pin 617 and at the other end engages a biasing bracket 619 connected to upper frame base 109, thus normally biasing wheel support frame 607 in the counterclockwise direction as viewed in Fig. 2. In this position, idler rollers 687 and 688 are pivoted to project into the passageway defined between inner platen assembly 500 and outer platen assembly 550 whereas friction drive wheels 612 and 613 are retracted from the passageway.

Figure 2:
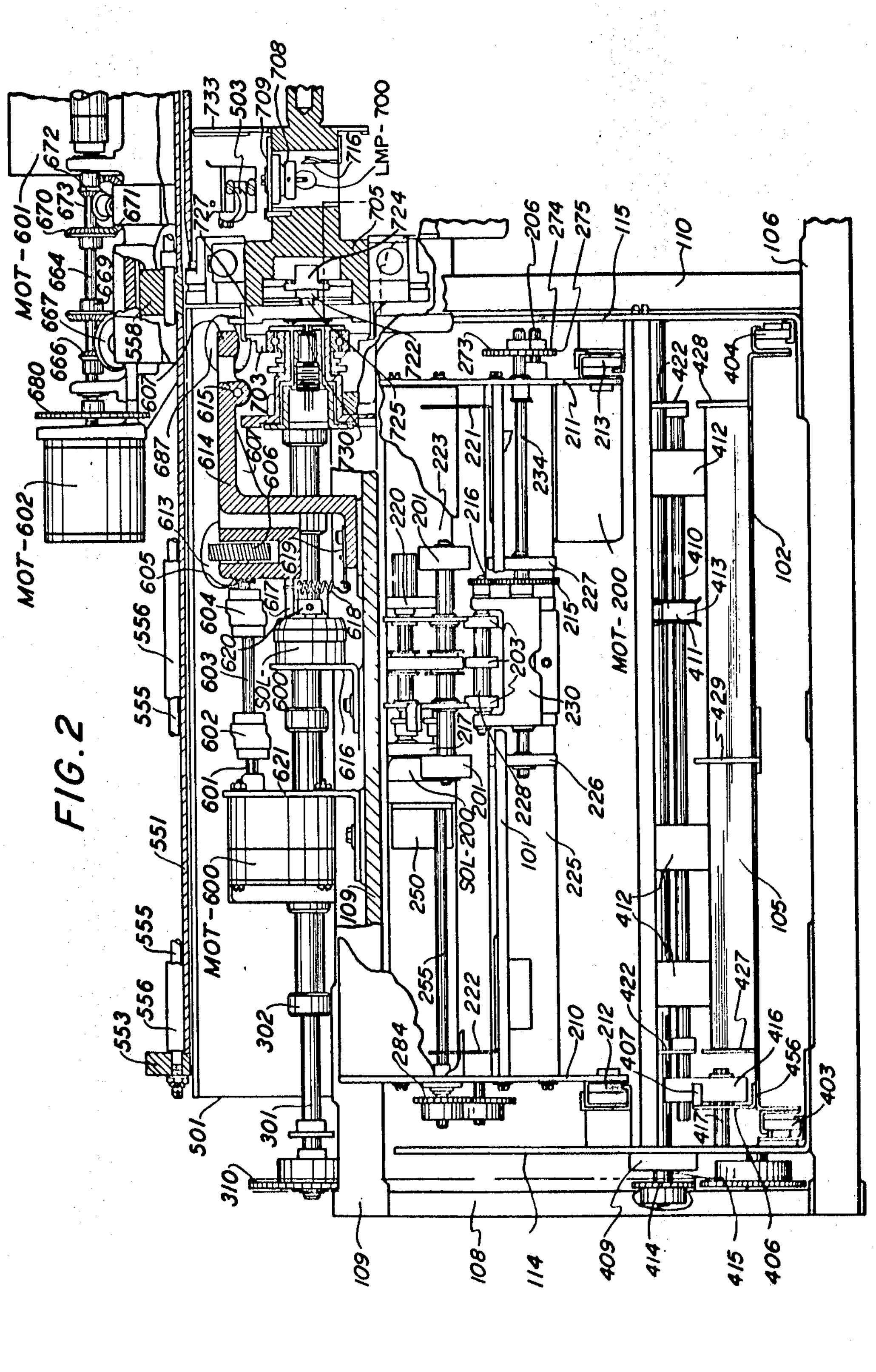
FIG. 2 is an elevational view of the left-hand portion of the machine of FIG. 1.
Figure 3:
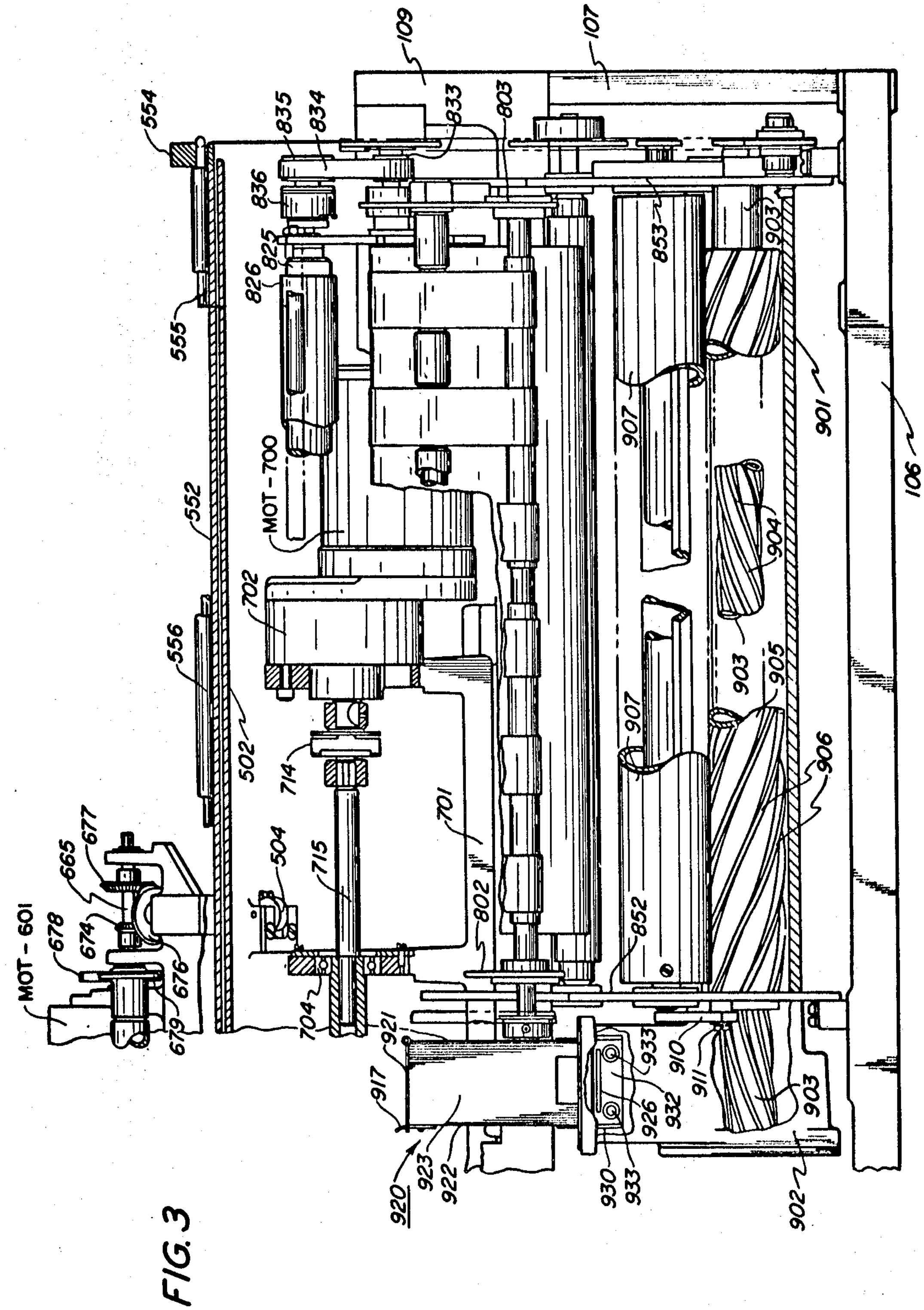
FIG. 3 is an elevational view of the right-hand portion of the machine of FIG. 1.
Figure 4:
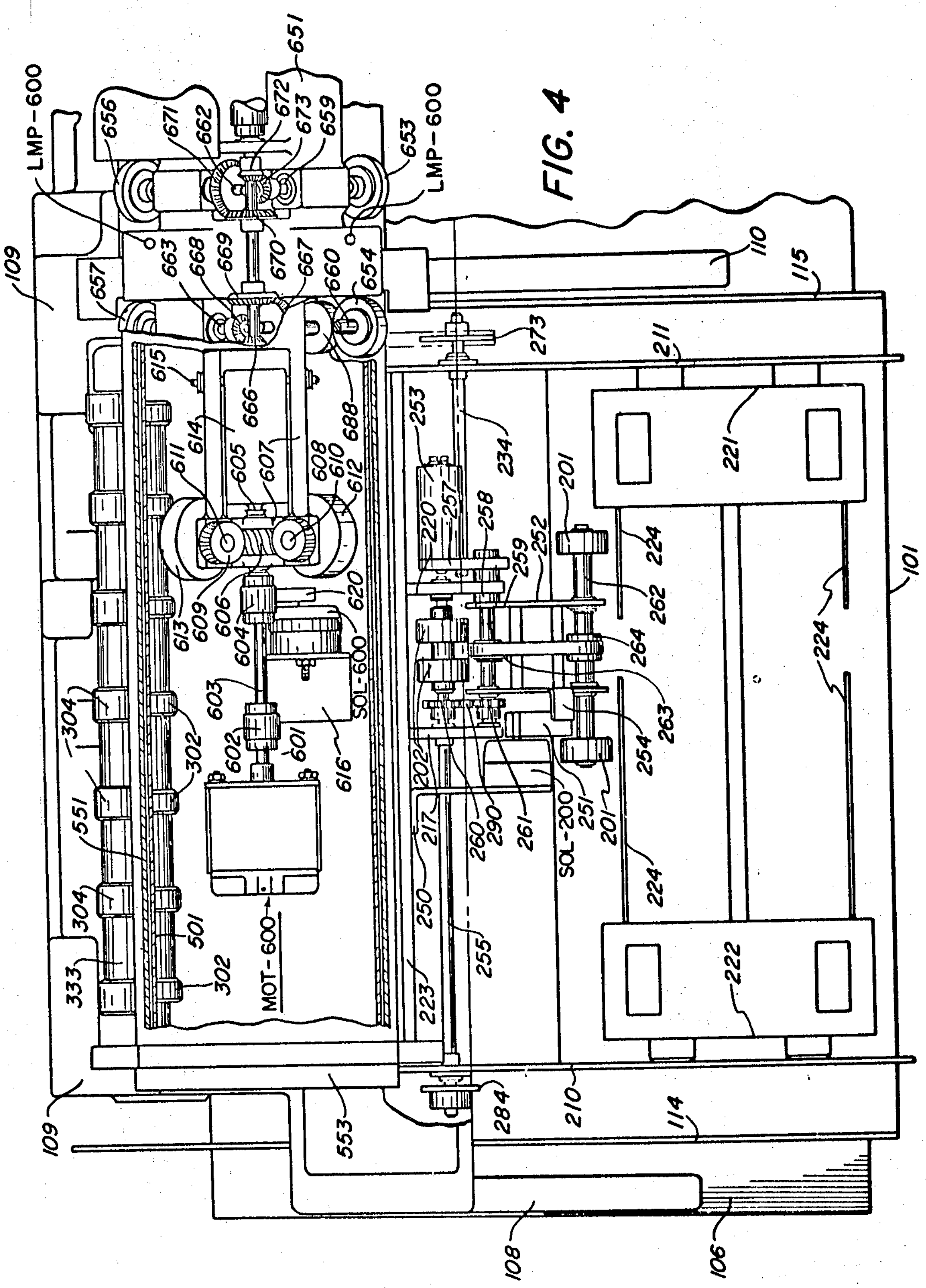
FIG. 4 is a plan view of the left-hand portion of the machine of FIG. 1.
Figure 5:
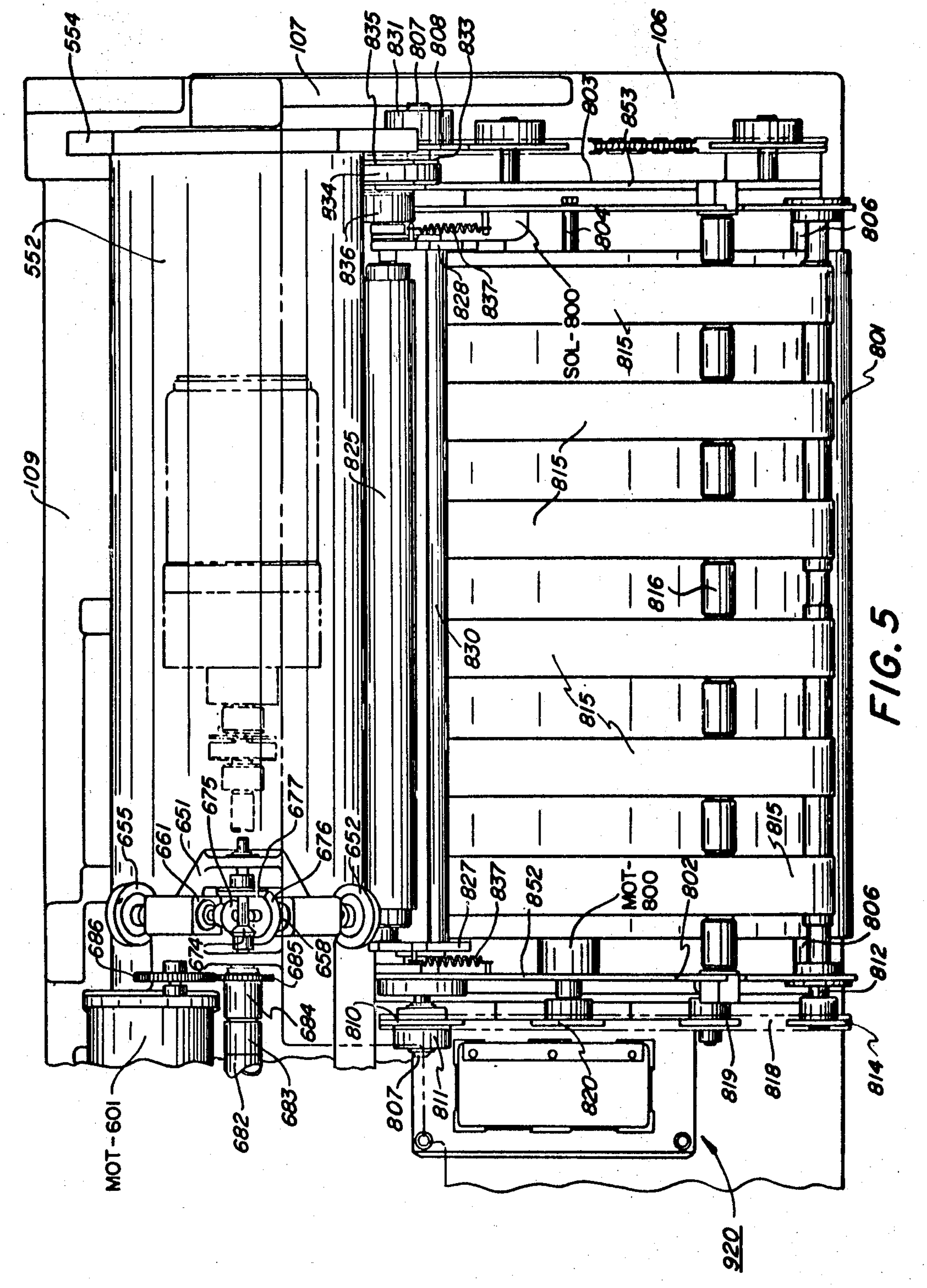
FIG. 5 is a plan view of the right-hand portion of the machine of FIG. 1.
Figure 6:
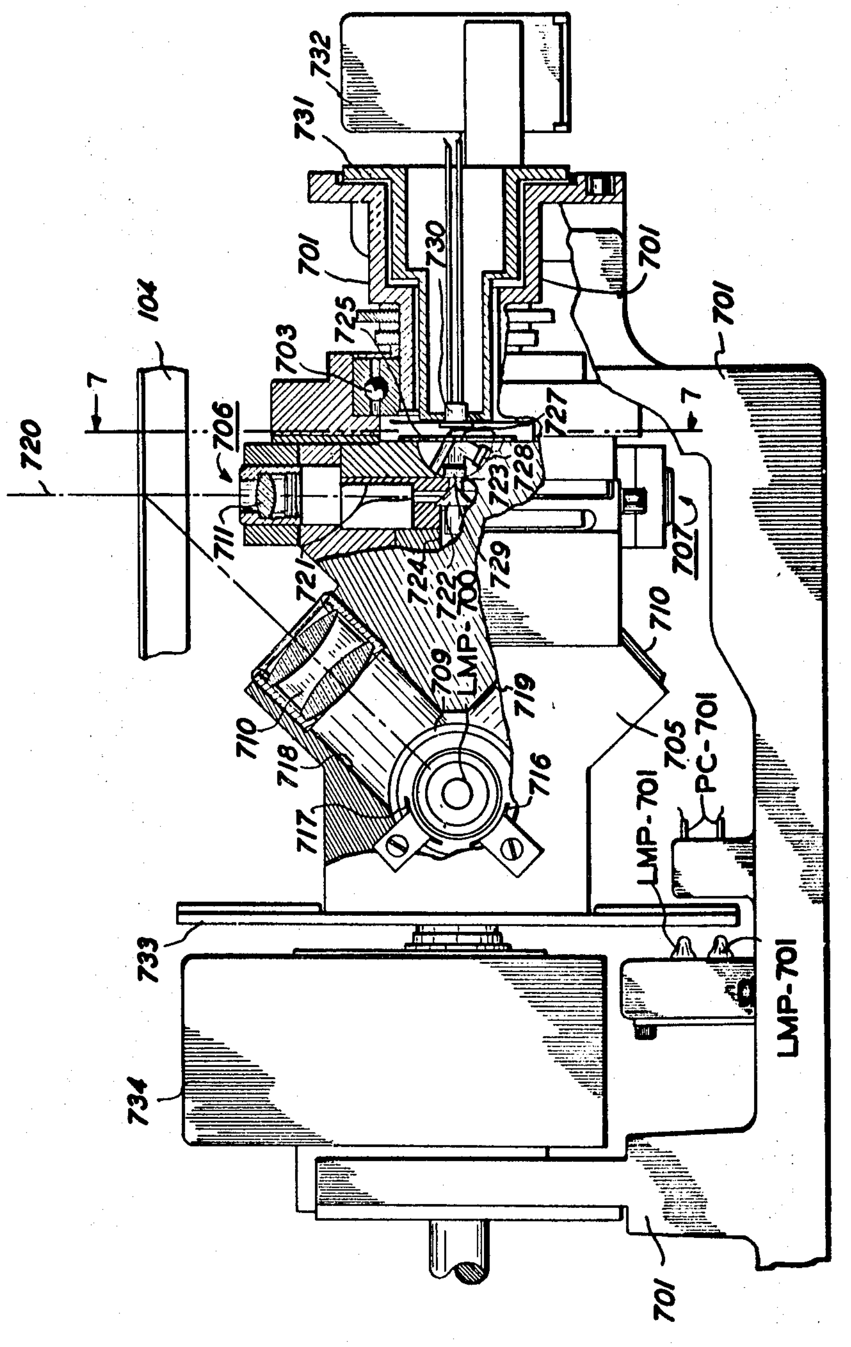
FIG. 6 is a partly broken away section of the scanning apparatus according to the present invention.

Output and stepping drive assembly generally designated 650 includes a frame member 651 rigidly connected to outer platen assembly 550. A plurality of friction drive rollers 652–657 are rotatably mounted in frame member 651 via drive shafts 658–663 respectively. Friction drive wheels 652–657 are axially and angularly positioned with respect to outer platen assembly 550 to align with the previously described idler roller members 503–506 and 687–688. That is, when the outer platen assembly 550 is in the closed position as shown in Figs. 2–4, friction drive wheel 655 is engaged with one of the idler rollers 504, friction drive wheel 652 is engaged with the other idler roller, friction drive wheel 656 is engaged with idler roller 503, friction drive wheel 653 is engaged with one of the idler rollers, friction drive wheel 657 is engaged with idler roller 687 and friction drive wheel 654 is engaged with idler roller 688.

A plurality of bevel gears 676, 673, 667, 675, 671, and 668 are connected to stub shaft 658, 659, 660, 661, 662, and 663 respectively to provide rotative movement of the respective friction drive wheels 652–657 connected thereto. A first drive shaft 664 is rotatably mounted in frame member 651 and includes a plurality of bevel gears 666, 669, 670 and 672 spaced axially therealong to engage the respective gears on stub shafts 663, 660, 662, and 659. Drive shaft 664 is driven via motor MOT–602 and spur gears 681 and 680. A second drive shaft 665 is rotatably mounted in frame member 651 and has connected thereto a pair of bevel gears 674 and 677 which provide rotative movement to friction drive wheels 655 and 652 via shafts 661 and 658 respectively. Drive shaft 664 and 665 are interconnected via a flexible coupling 682 and a pair of one way overriding clutch assemblies 683 and 684 which are of a type generally well known. A spur gear 685 connected to the one way overriding clutch assembly 684 meshes with a second spur gear 686 connected to the output shaft of motor MOT–601. From this arrangement MOT–601 may be effectively utilized to drive shaft 665 at a higher angular velocity than that which drive shaft 664 is being driven under the influence of motor MOT–602.

Thus, it may be seen that with a document in proper position within the passageway defined between inner platen assembly 500 and outer platen assembly 550, the document is first advanced at a high rate of speed to the scanning station 720 under the influence of the high-speed input drive 600, then intermittently stepped or advanced past the scanning station 720 under the influence of the stepping drive 650, and after clear of the scanning station 720 advanced at a high continuous rate of speed to the end of the passageway under the influence of drive wheels 652 and 655.

The advancement of both documents and copy sheets through the passageway is initiated in response to appropriate signals from the control logic of the machine. Upon receipt of such signals, solenoid–600 is activated to rotate lever arm 620 whereby to engage projection pin 617 connected to wheel support frame 607. This pivots wheel support frame 607 and friction drive wheels 612 and 613 rotatably connected thereto against the bias of spring 618 whereby the document within the passageway is frictionally engaged by the friction drive wheels 612 and 613. As motor MOT–600 is energized, drive wheels 612 and 613 are driven at a high rate of speed to advance the engaged document over retracted idler rollers 687 and 688 to scanning station 720.

The leading edge of record media approaching the scanning zone is detected by a pair of photosensors such as photodiodes (not shown) in backing member 558 and associated light sources LMP–600 in support member 502, which after a suitable time delay produce a signal through the control logic to inactivate the high-speed input drive 600 and activate stepping drive 650. Thus a suitable signal from the control logic of the machine deenergizes motor MOT–600 and solenoid SOL–600 thus retracting friction drive wheels 612 and 613 from engagement with the document within the passageway and pivoting idler roller members 687 and 688 into contact with the document therein under the influence of spring member 618. In this position the document is stepped or intermittently advanced axially within the passageway under the influence of the stepping drive assembly and motor MOT–602 which is activated in response to signals from the buffer storage circuitry. As the document is axially stepped through the scanning zone it ultimately becomes engaged between the bite of the subsequent pairs of friction drive wheels 653, 656, and 652, 655, and the respective idler rolls. After the trailing edge of the document clears the photodiodes and a suitable time delay, MOT–601 is activated to over drive, the friction drive wheels 652 and 655 at a higher rate of speed than the rate under which they were driven by stepping motor MOT–602. Thus under the influence of friction drive wheels 652 and 655 the document is advanced axially along the passageway toward the end thereof in position for subsequent removal therefrom. The dual speed drive arrangement thus provides for the added flexibility of removing a document from the scanning zone after scanning has taken place independent of the action of the stepping drive assembly whereby it is possible to bring a second document into the scanning zone without the consequent loss of time in waiting for the first document to completely clear the drive mechanism.

The reading and recording processes are accomplished at the scanning station 720 by means of a rotating turret assembly axially positioned at the central axis of the passageway defined between inner platen assembly 500 and outer platen assembly 550. The rotating turret assembly generally designated 700 includes a rotatable support member 705 which is rotatably mounted in a support frame casting 701 via bearings 703 and 704. Support frame casting 701 is mounted on the upper frame base member 109 via bolts or other suitable fastening means. Rotatable support member 705 during the operation of the machine is continuously driven at a constant angular velocity by means of a synchronous motor MOT–700 connected to rotatable support member 705 by means of gear reduction drive 702, flexible coupling 714 and drive shaft 715.

Figure 7:
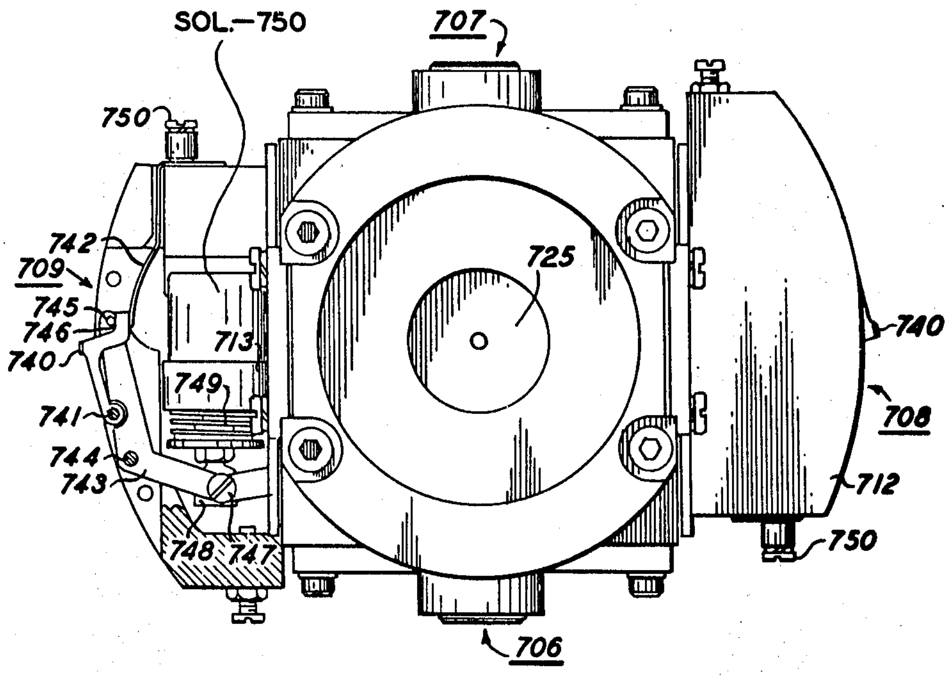
FIG. 7 is a partly broken away sectional view of the scanning apparatus taken along the lines 7—7 of FIG. 6.

As best seen in Fig. 7, rotating turret assembly 700 in the preferred embodiment includes a pair of recording heads 708 and 709 connected thereto and angularly disposed from each other on diagonally opposite sides of rotatable support member 705. In a similar manner turret assembly 700 includes a pair of reading or scanning heads 706 and 707 which are angularly disposed from each other on diagonally opposite sides of rotatable support member 705. Scanning heads 706 and 707 are further angularly disposed from recording heads 708 and 709 so as to provide equal angular spacing between each of the recording heads and the scanning heads. Thus in the preferred embodiment equal angular spacing of 90° is provided between each angularly adjacent recording and scanning head.

A light source such as a quartz lamp LMP–700 is mounted within rotatable support member 705 by means of lamp socket 708 and mounting plate 709. A pair of optical reflector members 716 and 717 are mounted on rotatable support member and extend therein adjacent light source LMP–700 to reflect light outwardly through passages 718 and 719 in rotatable support member 705. Condensing lens assemblies 710 are positioned within passageways 718 and 719 to condense a beam of light reflected by reflector member 716 and 717 for projection onto a document 104 positioned at the scanning station 720.

The scanning heads 706 and 707 each include an objective lens assembly 711 which are supported on rotatable support member 705 in position to receive patterns of light reflected from document 104 at the scanning station as the respective scanning heads traverse the document. Patterns of light thus reflected from document 104 at the scanning station 720 are projected by objective lens assemblies 711 radially within rotatable support member 705 through passages 721 onto an optical reflecting member such as prism 722. Prism 722 is held in position in axial opening 723 by means of a resilient support pad 724.

A photosensitive device such as photodiode 730 is mounted in main support casting 701 by means of diode support 731. Photodiode 730 is positioned adjacent rotatable support member 705 in optical alignment therewith to receive light axially reflected by prism 722 through the passage 723. An aperture plate 725 having a centrally located aperture therein is connected to rotatable support member 705 with the aperture therein being positioned within the optical path between prism 722 and photodiode 730 to produce a small spot of light at diode 730.

A pair of optical filters 728 and 729 are pivotably supported on a support member 727 to be selectively positioned into the optical path between prism 722 and aperture plate 725. Filters 728 and 729 are chosen for the optical characteristics which produce optimum results from selected ranges of background densities and colors.

The recording heads 708 and 709 each include an electrographic recording stylus 740 which are reciprocably mounted about pivot pins 741. Each stylus 740 is pivoted about pivot pins 741 to the extended position as shown in Fig. 7 under the influence of conductive leaf springs 742. Leaf springs 742 are preferably of a type which are formed of a bimetallic material. That is, a spring which is formed of two different types of material laminated together as a unitary spring. In the preferred embodiment, material such as beryllium copper or phosphor bronze with a copper foil backing attached thereto may be utilized. The conductive copper foil backing may be attached to the main body of the spring by means of an adhesive material. The resulting arrangement produces an overdamped conductive spring which is an essential element for effective operation of the recording heads 708 and 709.

Bell crank lever arms 743 are pivotably mounted within the recording heads 708 and 709 about pivot pins 744. Pin projections 745 connected to one end of bell crank lever arms 743 extend therefrom and are engageable with the surfaces 746 on recording styli 740. Solenoid SOL–750 are mounted in recording heads 708 and 709 by means of solenoid mounting blocks 713. The armature of solenoids SOL–750 are connected at one end thereof to bell crank lever arms 743 by means of screws 747 and slotted yokes 748. Compression springs 749 bias the armatures of solenoids SOL–750 to the extended position in the deenergized condition. Thus, in the deenergized condition bell crank lever arms 743 are pivoted in the clockwise direction as may be seen in Fig. 7 about pivot pins 744 under the influence of compression springs 749. As crank lever arms 743 are thus rotated about pivot pins 744, pins 745 contact the surfaces 746 on styli 740 thus pivoting styli 740 about the respective pivots 741 in opposition to the biasing action of springs 742. However, upon energization of solenoids SOL–750 bell crank lever arms 743 are pivoted counterclockwise about pivot pins 744 thus allowing styli 740 to pivot counterclockwise about the respective pivot pins 741 under the influence of leaf springs 742. This action moves styli 740 to the extended operative position as shown in Fig. 7.

Recording styli 740 are electrically connected to a high-voltage power source through conductive leaf springs 742, connector studs 750 and a slip ring assembly located in slip ring housing 743. A high-voltage switch which is part of an electronic drive circuit is opened and closed in response to the received graphic information signals to provide high-voltage pulses at recording styli 740 for charging the record media in a pattern representative of the information.

A planar disc member 733 is attached to rotatable support member 705 to rotate therewith. Disc member 733 includes a plurality of apertures suitably positioned therein which are utilized in enabling and disabling the transmit and receive control logic of the machine in phase with the positioning of the reading and recording heads with respect to the scanning station. In the preferred embodiment, a first pair of apertures are positioned at a first radial distance in disc member 733 at an angular spacing corresponding to the angular spacing of the read heads 706 and 707. A second pair of apertures are positioned at a second radial distance in disc member 733, the second pair of apertures being radially spaced from the first pair of apertures, at an angular spacing corresponding to the angular spacing of the recording heads 708 and 709.

A pair of miniature lamps LMP–701 and associated photosensors such as photodiodes PC–701, are positioned on opposite sides of disc member 733. Lamps LMP–701 and photodiodes PC–701 are suitably supported on upper frame base member 109 with one of the lamps LMP–701 and the associated photodiode PC–701 being positioned to align with the pair of read position apertures in disc member 733 and the other of the lamps LMP–701 and associated photodiode PC–701 being positioned to align with the pair of record position apertures in disc member 733 as disc member 733 is rotated. Photodiodes PC–701 are electrically connected to the control logic of the machine whereby the storage circuitry is enabled to receive electrical signals in phase with one of the read heads, 706, or 707 being at the start of scan position when operated in the transmit mode and is enabled to release stored information therefrom to the recording heads in phase with one of the recording heads 708 or 709 being at the start of scan position when operated in the receive mode. That is, when operated in the transmit mode the storage circuitry of the facsimile apparatus will be enabled by the respective photodiode PC–701 to receive electrical signals representative of an entire line of information on a document scanning station. Similarly, when operated in the receive mode the storage circuitry of the facsimile apparatus will be enabled by respective photodiode PC–701 to release stored electrical signals representative of an entire line of information to control actuation of the high-voltage switch and hence the operation of the respective recording head.

To operate the facsimile apparatus in the transmit mode, for example, the electronics and control logic of the machine are so conditioned by suitably arranged controls accessible to the operator. Upon such activation and release of various interlocks from other components of the machine, motor MOT–700 will be activated via the control logic to continuously rotate turret assembly 700 about its axis of rotation. In the transmit mode lamp LMP–700 will be continuously energized to project a beam of light from both passageways 718 and 719 via lens assemblies 710. A document 104 positioned at the scanning station 720 will thus be continuously scanned as the rotatable support member is rotated about its axis. The storage circuitry however will not be continuously enabled to receive electrical information generated by photodiode 730. Rather, the storage circuitry will be enabled only in response to having the capacity to store at least an entire line of information, and then in response to one of the read heads being at the proper rotative position as determined by photodiode PC–701, to insure that one continuous line of information will be available for storage. Thus the storage circuitry will be enabled to receive electrical information from photodiode 730 as light from one of the lamps LMP–701 impinges upon the associated photodiode PC–701 through one of the scan phasing apertures in disc member 733. A read head 706, for example, is rotated to scan position, the storage circuitry is activated to receive the electrical information generated as scan head 706 traverses document 104. Upon completion of the traverse of read head 706 across document 104, the storage circuitry is disabled until such time as read head 707 reaches scan position. At that time the storage circuitry is again activated in response to photodiode PC–701 to receive the electrical information generated as read head 707 traverses document 104.

There is provided in the facsimile apparatus a bandwidth compression circuit 14 for encoding the detected facsimile waveform. Binary encoder-decoder 14 is utilized for encoding or decoding the binary information when in the transmit or receive modes respectively. The input to the encoder in the transmit mode is a quantized binary video signal representing the black and white areas of information on the original document. The binary waveform is encoded to reduce the redundancy by the generation of code words representative of the lengths of black or data and white or background redundant information.

The binary video information is received at the encoder 14 from the scanning and digitizing circuits at a rate higher than the transmission capability of the communication channel. Such an increased scan rate is due to the fact that the purpose of the bandwidth compression circuit is to reduce the inherent redundancy of the material without the loss of information, and to transmit the resultant encoded data with a substantial reduction in required bandwidth time product.

After encoding, the data rate of the information from encoder 14 is substantially higher, because certain control bits, for example, must be inserted into the data stream in accordance with the particular binary encoding technique utilized. Load-unload control 16 therefore receives the encoded binary information from encoder 14 and transfers such information to the buffer storage unit 18 as the load-unload control 20 unloads the buffer storage unit 18 at the transmission rate. At certain times during the scanning process the scanned information will be reaching the buffer storage unit 18 at too fast an input rate. It is therefore necessary in such instances for the load-unload control 16 to emit a signal to interrupt the scanner operation until such time as the buffer storage unit 18 reaches a state capable of admitting further information.

Transmitted along with the encoded binary information is a unique sync word for delineating the separate scan lines. Such sync word is unique in the sense that the particular combination of binary digits comprising the particular word could not by definition appear in the output encoded waveform. The sync word is inserted into the information wave stream styli the load-unload control 20 by means of the respective photocell PC–701 which may be referred to as read index detector 58.

To operate the facsimile apparatus in the receive mode, the electronics and control logic of the machine are so conditioned by suitably arranged controls accessible to the operator. In the receive mode high-voltage switch 38 will be controllably actuated in response to electrical information stored in the storage circuitry to produce high-voltage charging pulses at the recording styli 740. With a copy sheet 105 in position at the scanning station 720 the storage circuitry will be enabled to release the stored information to the high-voltage switch as light from the other of the lamps LMP–701 impinges upon the associated photodiode PC–701 through one of the record phasing apertures in disc member 733. Thus as recording head 708, for example, is rotated to scan position, the storage circuitry is activated to release the stored information to the respective recording stylus as recording head 708 traverses copy sheet 105. Upon completion of the traverse of recording head 708 across copy sheet 105, the storage circuitry is disabled until such time as recording head 709 reaches scan position. At that time the storage circuitry is again activated in response to photodiode PC–701 to release the stored information, providing high voltage pulses at the respective recording stylus 740 as recording head 709 traverses copy sheet 105.

In the receive mode, the two-level binary signals derived from the receiver are applied to a frame code detector 32 which is utilized to detect the unique sync word which is inserted in the binary wave train at the transmitting receiver. Upon detection of the sync word, the storage control 66 is energized and advanced one count. The output information from the frame code detector 32 is then passed onto load-unload control 20 which is used to load the buffer storage 18 with the binary encoded information. Load-unload control 16 draws the information from the buffer storage 18 at a rate to be utilized by the recording process. As the information is unloaded from the buffer storage through the load-unload control 16, an additional frame code detector 34 detects the same unique sync word which was detected at frame code detector 32.

Upon detection of the sync word at 34, a signal is used to count down the storage control 66. The counting up and counting down operation is utilized so that the storage control 66 will be able to detect the number of lines stored at the buffer storage 18.

After buffer storage, the binary encoded information is directed to the binary decoder 14. This decoder, in a manner similar to that described in connection with the transmit mode, reconstructs the signal waveform with its associated redundancy.

Figure 8:
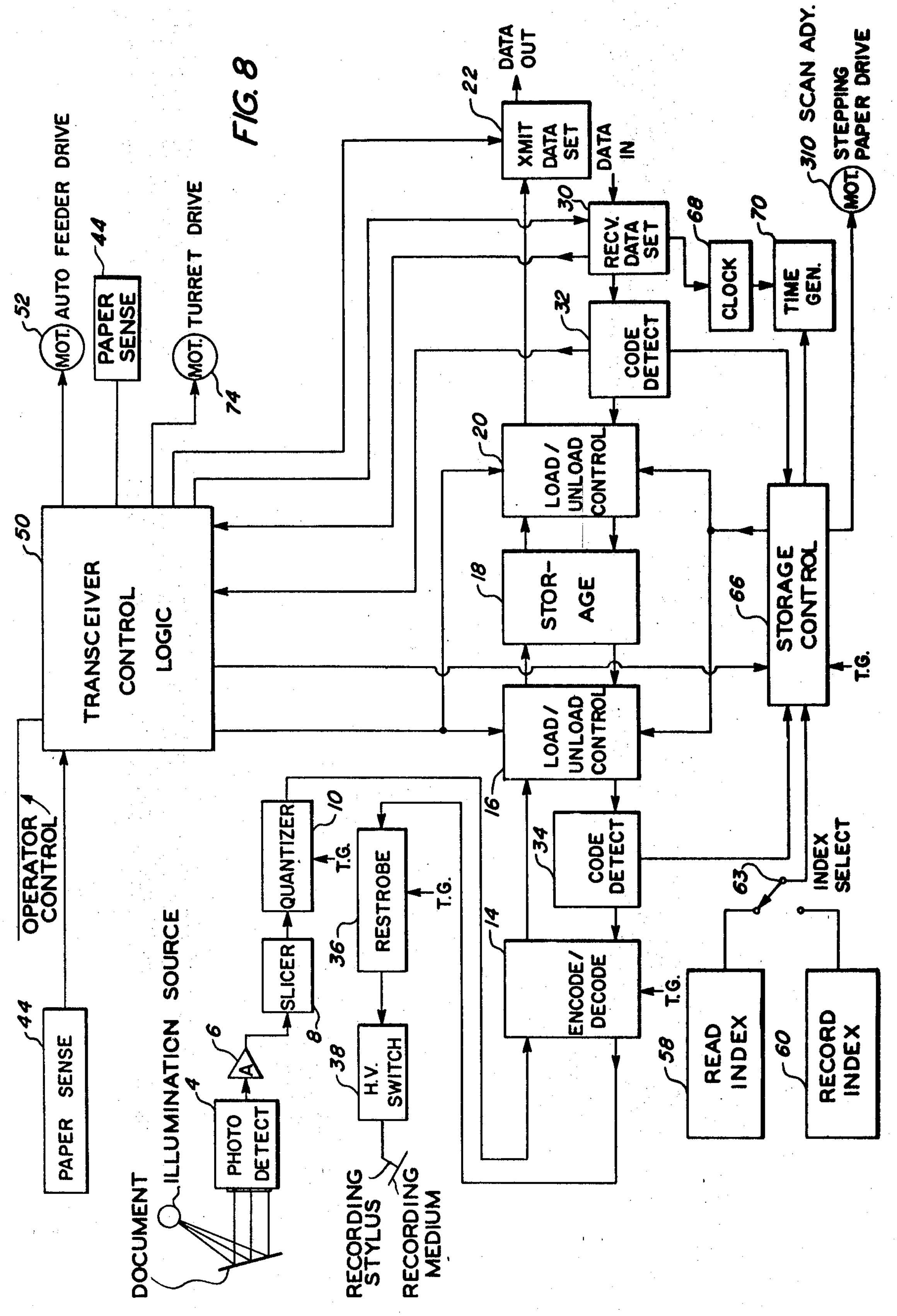
FIG. 8 is a block diagram illustrating the electrical portion of a facsimile transceiver in which the scanning apparatus according to the present invention is particularly adapted for use.

A restrobe unit 36 is provided to retime the output binary information to a condition which can be applied to the recording process. The output from the restrobe unit 36 energizes a high-voltage switch 38, conditioned of course upon one of the recording heads being at the proper rotative position as determined by photodiode PC–701 or as designated in Fig. 8 as record index 60.

In both the transmit and receive modes, the record media is advanced past the scanning station to bring successively adjacent scan lines into position thereat by the stepping drive 650 under control of storage control 66, the operation of which is more fully described in copending application Ser. No. 765,538 filed concurrently herewith in the names of Hansen et al. and assigned to the same assignee as the instant application.

The exact nature of the charging process in the recording mode is not completely known. It is known however, that in the particular apparatus referred to herein, the electrical signal generated as a result of the scanning of a document at another location by measuring reflected light levels of the information thereon may be utilized to apply a voltage or potential to the recording styli 740 at any point in time representative of the reflectivity of a dot or small portion of the scanned information. Thus, by applying an applicably high potential between the recording styli 740 and the backing member 558, through the electronic drive circuit a residual voltage proportionate to the applied voltage level will remain on the surface of the dielectric record media. This charge may be deposited on the dielectric by air ionization occurring at or around the sharp edges of the stylus where the electric field gradient is highest. It is probable that the charge is in the form of ionized gas molecules, perhaps residing on the low spots of the dielectric surface, since a grounded stylus does not discharge the surface significantly. In any event, the dielectric record media is charged according to a pattern of graphic information as the potential is applied to the respective styli. Subsequent to charging, the pattern of graphic information may be rendered visible by means of a developing apparatus such as that disclosed in copending application, Ser. No. 759,178 filed concurrently herewith in the names of Gerald Buddendeck et al. and assigned to the same assignee as the instant invention.

In order to obtain an electrographic charge pattern on the dielectric in accordance with the representative pattern of intelligence and having the requisite resolution, it is necessary that the styli be supported in contact with the dielectric under a low normal force without permitting or inducing undesirable oscillations in the styli. The damped laminated leaf springs 742 thus provide the proper biasing force without permitting bouncing or oscillations of an undamped nature to occur as the styli 740 traverse across the dielectric. Thus any undesirable effects which might otherwise occur as a result from bounce or jitter induced into the recording styli in the dynamic condition are eliminated.

From the foregoing description it may be seen that there is provided a scanning apparatus which is particularly adapted for use in a facsimile transceiver having first transducing means associated therewith for converting information on record media into representative electrical signals for transmission to a remote location when the transceiver is operated in the transmit mode and transducing means also associated therewith for converting electrical signals received from a remote location into representative patterns of information on record media when the transceiver is operated in the receive mode.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Scanning apparatus particularly adapted for use in a facsimile transceiver for converting information on record media into electrical signals for transmission to a remote location when the transceiver is operated in the transmit mode and for converting electrical signals received from a remote location into representative information on record media when the transceiver is operated in the receive mode comprising in combination, a first media support member having a convex semicylindrical surface extending axially therealong, a second media support member having a concave semicylindrical surface extending axially therealong, said first and second media support members cooperating when in the operative position to form a curvilinear passageway through which record media are advanced, rotatable support means adapted for rotation about an axis extending longitudinally along said curvilinear passageway, first transducer means including a light source mounted within said rotatable support means for illuminating record media positioned within said passageway, first optical means mounted on said support means for projecting a beam of light from said light source onto record media positioned within said passageway adjacent said rotatable support means, second optical means mounted on said support means for projecting reflected patterns of light from illuminated record media to within said support means, light reflecting means disposed within said support means to reflect patterns of light from said second optical means axially within said support means, photosensitive means axially disposed to said light reflecting means for generating an electrical signal in response to impinging light patterns, second transducer means including electrographic stylus means reciprocably mounted on said rotatable support means and adapted when in the extended position to contact record media positioned within said passageway adjacent said rotatable support means, first spring means for biasing said stylus means toward the extended position, linkage means operatively coupled to said stylus means for retracting said stylus means from the extended position, second spring means operatively coupled to said linkage means normally biasing said stylus means to the retracted position in opposition to said first recited spring means, electromagnetic drive means operatively coupled to said linkage means for driving said linkage means in opposition to said second spring means whereby to permit said stylus means to move to the extended position under the influence of said first recited spring means, and means for applying an electrical potential to said stylus means in response to received electrical signals representative of information whereby to place a charge pattern on record media positioned within said passageway according to the information configuration.

2. Apparatus according to claim 1 further including, means for storing a quantity of electrical signals representative of information, and control means operatively associated with said storage means and said first and second transducer means to activate the respective transducer means when said transceiver is operated in the respective transmit and receive modes.

3. Scanning apparatus adapted for use in a facsimile transceiver comprising in combination, means defining a passageway through which record media are supported and advanced, said passageway having an arcuate configuration in a lateral direction and a linear configuration in a longitudinal direction, rotatable support means axially positioned adjacent said passageway for rotation about the longitudinal axis thereof, first transducer means operatively associated with said rotatable support means for converting information on record media into representative electrical signals, means for storing a quantity of electrical signals representative of information, and control means operatively associated with said storage means and said transducer means for activating said transducer means to generate said representative electrical signals, electrographic stylus means reciprocally mounted on said rotatable support means and adapted when in the extended position to contact record media positioned within said passageway, and means for applying an electrical potential to said stylus means in response to received electrical signals representative of information whereby to place a charge pattern on record media positioned within said passageway according to the information configuration.

4. Apparatus according to claim 3 including:

first spring means for biasing said stylus means toward the extended position, linkage means operatively coupled to said stylus means for retracting said stylus means from the extended position, second spring means operatively coupled to said linkage means normally biasing said stylus means to the retracted position in opposition to said first recited spring means, electromagnetic drive means operatively coupled to said linkage means for driving said linkage means in opposition to said second spring means whereby to permit said stylus means to move to the extended position under the influence of said first recited spring means.

5. Apparatus according to claim 4 wherein said first recited spring means includes, damping means operatively associated therewith for preventing undesirable vibrations of said stylus means in the extended position as said transducer means traverses said record media.